UNITED STATES PATENT OFFICE.

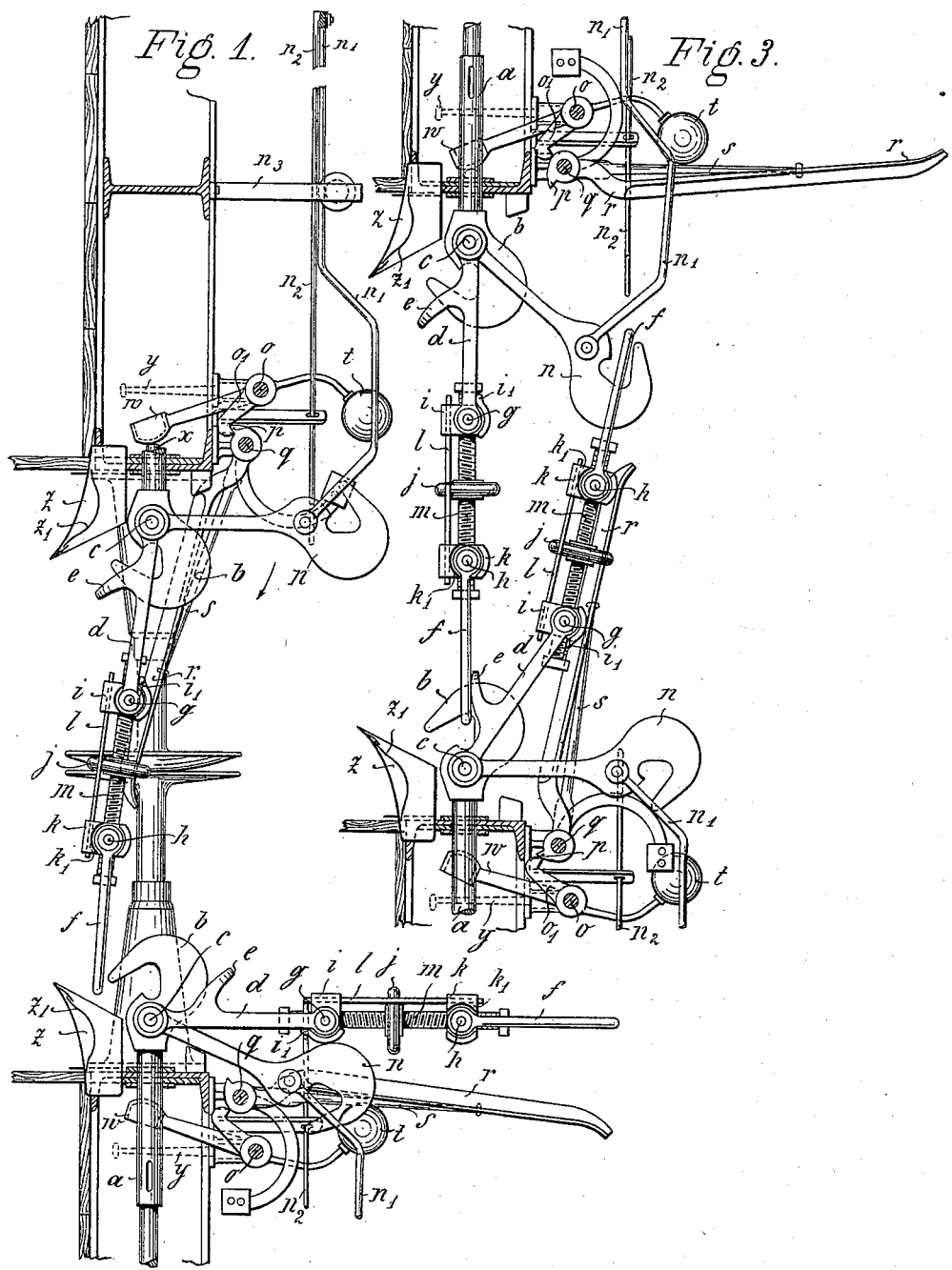

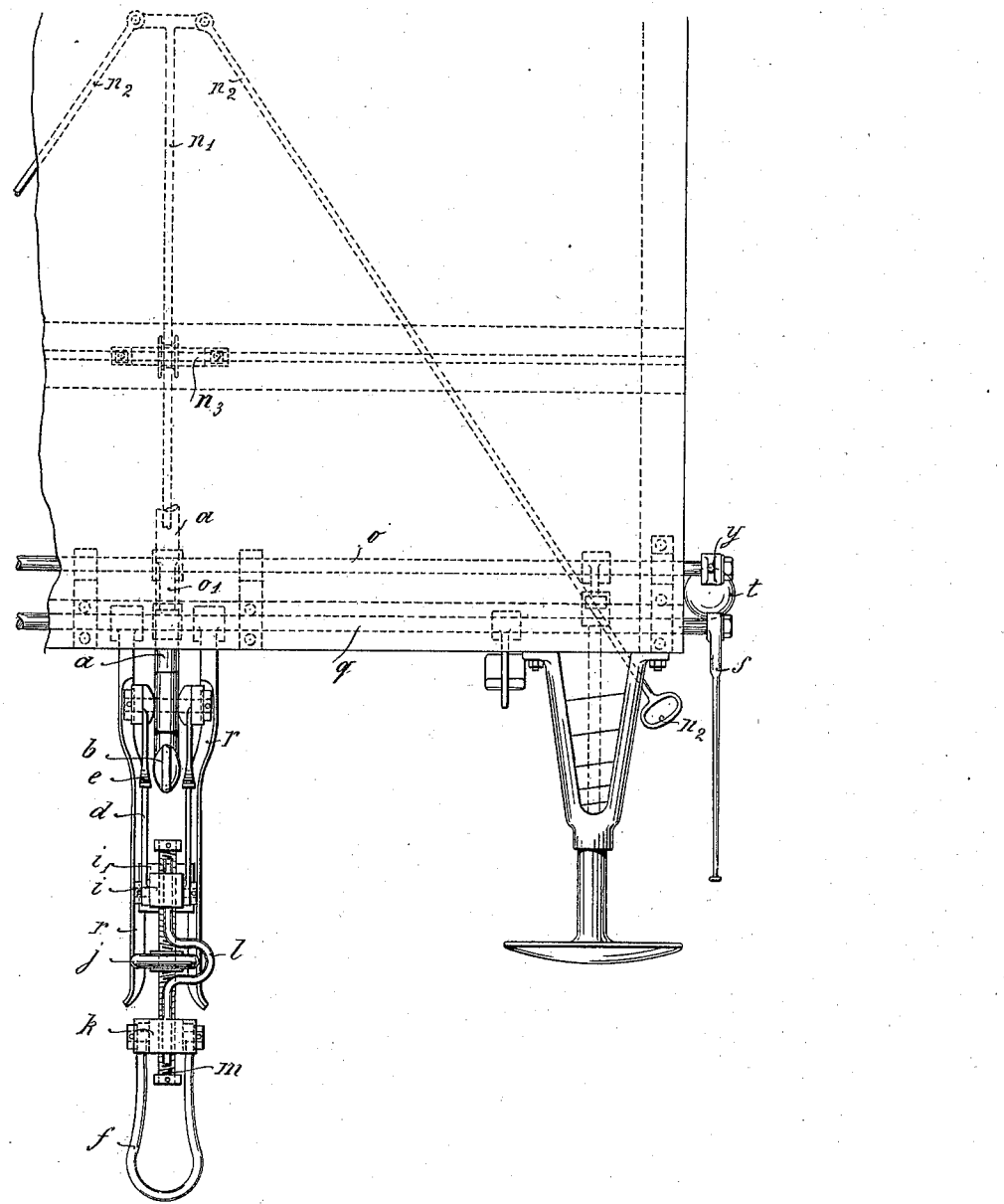

ALFRED RUSCHER, OF BRUCK-UJFALN, AUSTRIA-HUNGARY.

CAR-COUPLING.

SPECIFICATION forming part of Letters Patent No. 606,245, dated June 28, 1898.

Application filed April 2, 1898. Serial No. 676,192. (No model.)

*To all whom it may concern:*

Be it known that I, ALFRED RUSCHER, a subject of the Emperor of Austria-Hungary, and a resident of Bruck-Ujfaln, Austria-Hungary, have invented a certain new and useful Improvement in Car-Couplings, of which the following is a specification.

This invention relates to the class of screw-couplings for railway-cars; and its purpose is to enable the coupling and disengaging of the main and safety coupling to be done from outside the buffers and to enable the main coupling to act automatically. Besides the advantages of an automatic coupling the advantage is also obtained that already existing couplings of this class can be converted into the new coupling with slight alteration only, which essentially diminishes the cost of fitting cars with the new coupling. The further advantages of this coupling are that it can be arranged on all kinds of cars; that it couples with already existing couplings; that each coupling, as well main as also safety coupling, can be coupled or disengaged by itself without interfering with the other, and also it is only in connection with the draw-rod, so that if the coupling is accidentally torn off no other part of the car would be injured.

The coupling is of the nature of an ordinary screw-coupling, but at the pivotal bolt it can only be foldable downward, and its bow is turnable only within small limits. It comprises disengaging-noses, also a lifting device for these noses, consisting of a shaft, to be operated from outside the buffers with lifting-arms and a stop-tooth, and a second shaft with a click and disengaging-levers, and finally a device for lifting the D-hook, consisting of a rod connected with the same and guided on the car, this rod being connected with draw-rods guided to both sides of the car.

In the annexed drawings, Figure 1 shows an example of construction of this coupling in the state of engagement in side view and partial section. Fig. 2 is a plan view corresponding with Fig. 1. Fig. 3 shows the main coupling in operation and the safety-coupling at the moment of engaging.

With the usual draw-rod $a$, having spring bearing in the car-frame and provided with draw-hooks $b$, there are bars $d$, by means of bolts arranged in the draw-hook $b$, which bars are provided with the noses $e$ for effecting the disengagement of the main coupling.

At their outer ends the bars $d$ are connected in such a manner with the nut $i$ that the whole coupling at this place is only foldable downward, but forms upwardly a rigid joint. This is obtained by a projection $i'$ of the nut $i$, which presses against the bars $d$.

The nut $i$ is connected with the second nut $k$ by the known right and left coupling-screw $m$. This screw $m$ serves for tightening the main coupling, for the turning of which there was arranged hitherto a lever. This lever is now replaced by a hand-wheel $j$, which allows the turning of the spindle $m$, also from outside, by simple means—for instance, a lever reaching into the spokes. $l$ is a guiding-rod displaceable in one or both nuts and bent bow-like round the hand-wheel to prevent the nuts from turning. With the nut $k$ there is connected the coupling-bow $f$ by means of pins $h$, which nut $k$ is provided in such a manner with lateral projections $k'$ that the bow can move freely only through a small angle.

The lifting device for the screw-coupling consists of a shaft $q$, journaled transversely of the car and adapted to be operated on both sides of the cars from outside the buffers by means of levers $s$, and carries lifting-arms $r$, which seize the screw-coupling $d\, m\, f$, according to the position of the same, either at the nut $k$ or $i$, or at both, for which purpose their under parts project laterally and are curved. This shaft carries, further, an arresting-tooth $p$, the purpose of which is described hereinafter. To the lifting device there belongs also a second shaft $o$, journaled transversely of the car and carrying on one side a click $o'$ and on the other side lever-arms $w$, which project within the reach of the buffer-rods $x$, Fig. 1, at the right. This shaft has, further, balance-weights $t$ and hand-levers $y$, with which latter the same can be operated from both sides of the car and outside the buffers. On the draw-hook $b$ there is further pivoted the usual D-hook $n$ of the safety-coupling, which hook can be lifted or lowered by a rod $n'$, guided at $n^3$, together with two draw-rods $n^2\, n^2$, to be operated on both sides the car. Instead of this drawing device there can be arranged on the car a third shaft with lifting-arms, which serves only for raising and lowering the D-hook.

The action of this coupling is as follows: When the main coupling is to act automatically by pushing the cars together, the levers $s$ of the shaft $q$ of one car must be previously raised in the direction of the arrow, so that the lifting-arms $r$, and with these the screw-coupling $d\ m\ f$, come into the position shown in Fig. 1, and are fixed in this position by the click $o'$ falling into the arresting-tooth $p$. When the carriages meet, the buffer-rods $x$ push the disengaging-levers $w$, whereby the shaft $o$ is turned and the click $o'$ is lifted from the arresting-tooth. The lifting-arms $r$ then return into their normal position, Fig. 1, at the left and the bow $f$ falls into the draw-hook $b$ of the other car.

For the secure engagement of the coupling-bow with the draw-hook there is fitted a hood $z$, which may have a spring $z'$. This hood is fixed above the draw-hook and in the form of a case, or is composed of rods and renders an escaping of the bow impossible in all directions, and is therefore important, especially when coupling on curves with small radius. Where a disengagement of the shaft $q$ by the carriages knocking together is not desired, this is effected in a simple manner by means of one of the levers $y$ as the same is moved in the direction of disengagement at the right moment—that is to say, when the bow $f$ is just above the draw-hook. The coupling-screw $m$ is screwed up either before or after the coupling, in the latter case by turning the wheel $j$ by means of an appropriate tool from outside the buffers.

For the purpose of connecting the safety-coupling from outside, Fig. 3, the hanging screw-coupling is lifted by means of the levers $r$ on the shaft $q$, and the D-hook $n$ of the other carriage is lifted by means of the drawing device $n'\ n^2$ and the two are connected together.

The couplings are disengaged in the following manner: When disengaging the safety-coupling, the drawing devices $n'\ n^2$ of both cars—that is, also of both D-hooks—are drawn, whereby the one coupled D-hook is lifted from the bow and the screw-coupling of the safety-coupling is extended, but both return into their normal position. When disengaging the main coupling, the uncoupled screw-coupling is lifted either by turning the levers $r$ or the D-hook $n$ upward, whereby the noses $e$ on the bars $d$ lift the bow $f$ from the draw-hook $b$ and the screw-coupling is folded and falls down.

The difference of height of the carriages has no injurious influence on the operation of the coupling.

I claim as my invention—

1. An improved railway-coupling comprising a screw coupling-link consisting of bars $d$ having disengaging-noses $e$, the nut $i$ foldable downwardly, screw $m$, nut $k$ and the coupling-bow $f$ turnable on its nut $k$ only within small limits, in combination with a lifting device for the screw coupling-link consisting of a shaft $q$ journaled transversely of the car having means for operation outside the buffers, lifting-arms $r$ and an arresting-tooth $p$ on said shaft $q$ a second shaft $o$ a click $o'$ thereon disengaging-levers $w$ thereon and buffers having rods $x$ adapted on receiving end thrust to move said levers $w$ for the purpose set forth.

2. An improved railway-coupling comprising a screw coupling-link consisting of bars $d$ having disengaging-noses $e$, the nut $i$ foldable downwardly, screw $m$, nut $k$ and the coupling-bow $f$ turnable on its nut $k$ only within small limits, in combination with a lifting device for the screw coupling-link consisting of a shaft $q$ journaled transversely of the car having means for operation outside the buffers, lifting-arms $r$ and an arresting-tooth $p$ on said shaft $q$ a second shaft $o$ a click $o'$ thereon disengaging-levers $w$ thereon and buffers having rods $x$ adapted on receiving end thrust to move said levers $w$ and a D-hook $n$ suspended from said hook $b$ and a device for lifting the D-hook $n$ consisting of a rod $n'$ connected thereto guides on the carriage for said rod $n'$ and draw-rods $n^2$ attached to rod $n'$ and passing to both sides of the carriage, for the purpose set forth.

3. An improved railway-coupling comprising a screw coupling-link consisting of bars $d$ having disengaging-noses $e$, the nut $i$ foldable downwardly, screw $m$ nut $k$ and the coupling-bow $f$ turnable on its nut $k$ only within small limits, in combination with a lifting device for the screw coupling-link consisting of a shaft $q$ journaled transversely of the car having means for operation outside the buffers, lifting-arms $r$ and an arresting-tooth $p$ on said shaft $q$ a second shaft $o$ a click $o'$ thereon disengaging-levers $w$ thereon and buffers having rods $x$ adapted on receiving end thrust to move said levers $w$ and a connecting-rod $l$ between the two nuts $i\ k$ of the screw-coupling, for the purpose of securing the same against turning, for the purpose set forth.

4. An improved railway-coupling comprising a screw coupling-link consisting of bars $d$ having disengaging-noses $e$, the nut $i$ foldable downwardly, screw $m$ nut $k$ and the coupling-bow $f$ turnable on its nut $k$ only within small limits, in combination with a lifting device for the screw coupling-link consisting of a shaft $q$ journaled transversely of the car having means for operation outside the buffers, lifting-arms $r$ and an arresting-tooth $p$ on said shaft $q$ a second shaft $o$ a click $o'$ thereon disengaging-levers $w$ thereon and buffers having rods $x$ adapted on receiving end thrust to move said levers $w$ and a hood adapted to receive the bow $f$ of the screw-coupling, for the purpose set forth.

In witness whereof I have signed this specification in the presence of two witnesses.

ALFRED RUSCHER.

Witnesses:
HENRY C. CARPENTER,
CHAS. E. CARPENTER.